United States Patent [19]
Udelle et al.

[11] Patent Number: 5,575,240
[45] Date of Patent: Nov. 19, 1996

[54] ANIMAL ATTRACTING SOUND PRODUCING BALL

[76] Inventors: Steven D. Udelle; Laura L. Udelle, both of 26414 Barranquilla Ave., Punta Gorda, Fla. 33983

[21] Appl. No.: 503,841

[22] Filed: Jul. 18, 1995

[51] Int. Cl.$^6$ .................................................. A01K 29/00
[52] U.S. Cl. .................................... 119/707; 446/409
[58] Field of Search .................................. 119/702, 706, 119/707, 709; 446/409

[56] References Cited

U.S. PATENT DOCUMENTS

| | | | |
|---|---|---|---|
| 1,789,333 | 1/1931 | Da Costa | 119/707 |
| 4,391,224 | 7/1983 | Adler | 119/707 |
| 4,577,590 | 3/1986 | Skroch . | |
| 5,112,055 | 5/1992 | Barnhill | 446/409 |
| 5,260,512 | 11/1993 | Chomette et al. | 446/409 |
| 5,265,559 | 11/1993 | Borell | 119/707 |
| 5,375,839 | 12/1994 | Pagani | 446/409 |
| 5,439,408 | 8/1995 | Wilkinson | 446/409 |

FOREIGN PATENT DOCUMENTS 1172585  6/1964  Germany ............... 446/409

Primary Examiner—Todd E. Manahan

[57] ABSTRACT

An animal attractant device is disclosed, comprising a ball shaped enclosure 10, a pressure sensitive switch assembly 9, and a dual sound synthesizer assembly 8. The device lures an animal into engaging or contacting the ball by intermittant, luring sounds from synthesizer 36, thereby initiating frequent use of the device. As an animal manipulates or rolls the device, an occasional contact of the pressure sensitive pad 16 of pressure sensitive switch assembly 9 by the animal or floor surface, initiates a brief sound from the second synthesizer 38 unlike the continuous, intermittant lure sound of synthesizer 36.

7 Claims, 2 Drawing Sheets 5,575,240

ANIMAL ATTRACTING SOUND PRODUCING BALL

FIELD OF THE INVENTION

The present invention relates to stationary and self moving toys or devices that provide amusement or exercise for animals, but more particularly to a stationary device that takes advantage of an animal's inherent curiosity and instinct, thereby provoking an animal into imminent contact, and moving of the device for extended periods of time.

BACKGROUND-DISCUSSION OF THE PRIOR ART

U.S. Pat. No. 5,265,559, by Borell, Nov. 30, 1993, discloses a ball and flexible flag tail pet toy. The ball has to be thrown, thereby causing the flag tail to flutter. U.S. Pat. No. 4,577,590, by Skroch, Mar. 25, 1986, shows a wild mouse cat scratch pole having a mouse suspension and retraction unit that produces an audible sound at the point of full retraction. This device tips over constantly and the suspension string or tether is potentially harmful to a cat's soft spot between its toes as well as the danger of entanglement. This device is void of movement and sound, until a cat activates the device by pulling the string or tether downwards, releases, and allows the mouse to be retracted. A ball currently sold by Wal-Mart called, Dizzy Wiggle Ball, Wal-Mart No. TS-B3002BC, made in China and marketed by Wal-Mart Stores, Inc., shows a ball with a battery operated motor that produces an eccentric motion within the ball causing it to roll and wiggle erratically, comprised of two halves mated by threads. The ball becomes trapped when blocked on some occasions and the battery life is extremely short. This device is only useful when activated and monitored by a human, to determine when to deactivate the device when abandoned by the animal to conserve battery power. The turnable switch button on many occasions does not power the motor, unless repeatedly turned. Other balls or devices have been made that contain catnip or bells within, for luring an animal into play, but these devices have produced little incentive.

SUMMARY OF THE INVENTION

The present invention takes advantage of the inherent instincts and curiosity of an animal's response to sound, when the original sound is not initiated by the animal or human hand, but by the device. Generally, the present invention is comprised of a movable or rollable object, such as a ball containing two electronic sound synthesizers within its housing. The first synthesizer is powered by a small battery and is activated by a manual switch lever. A remote, pressure sensitive switch on the device surface, activates a second synthesizer powered by the same battery, but bypasses the first synthesizer switch. When the first synthesizer is activated, it emits a continuous intermittant scratching sound at spaced intervals. When the animal is in contact with the device surface, and puts pressure on the pressure sensitive switch or pad, the second synthesizer will emit a brief series of mouse related squeaks. The preferred sound is that of a mouse producing scratching noises within an enclosed area. This scratching sound, when tested by applicants, proved to be extremely effective. The cats would spend a great deal of time investigating, sniffing, and clawing at an enclosure emitting this sound. This scratching sound is irresistible to an animal, and will always draw the animal to the device. The animal's attempts at the elusive sound within the device housing produces a continuous movement or rolling of the device over a wide area as the animal persistantly tries to access the sound.

It is therefore an object and advantage of the present invention to provide an improved and frequently used animal attractant device.

It is an object of the invention that an animal expend its surplus energy, thereby improving its alertness, coordination, and sleeping habits.

It is another object of the invention to provide sound as the most effective means of luring an animal to a device.

Another object of the invention is that the device would relieve the animal from boredom, thereby saving areas of household furniture from claw scratching damage.

Yet another object of the invention is to simulate nature; to satisfy the animal's natural curiosity and inherent hunting and stalking instincts in a safe and humane way, thereby keeping the animal happy, healthier, and more content.

Other objects and advantages may be readily determined by the following descriptions.

COMPLETE DESCRIPTION OF THE INVENTION

Figure 1A:
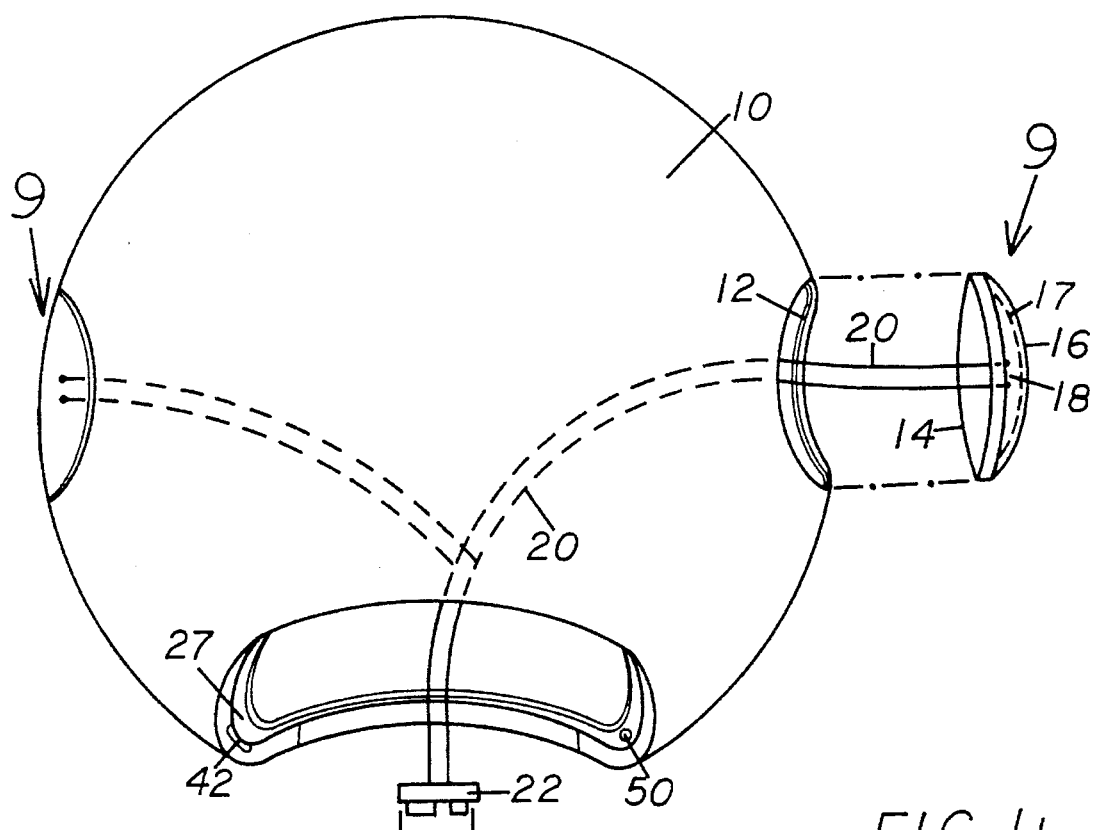
FIG. 1a is an exploded perspective view of a ball shaped enclosure, pressure sensitive switch assembly and circuit, and a sound synthesizer assembly and circuit.

FIG. 1a is an exploded perspective view of a ball shaped enclosure 10, pressure sensitive switch assembly 9, and a sound synthesizer assembly 8 showing a power supply 28, wiring 20, switch 34, and two sound synthesizers 36 and 38, integrally grounded to frame 39. The ball shaped enclosure 10 shows switch assembly 9 having a flexible plastic membrane 16 integral to a foil or conductive material 17 on its backside. The inner portion of-switch assembly 9 includes a rigid portion 14 having two contacts 18 sufficiently spaced from foil backing 17 with connecting wires 20. The flexible plastic membrane 16 is permanently affixed to rigid portion 14 and assembly 9 is permanently affixed to recessed opening ledge 12 of the ball shaped housing 10. Assembly 9 is also shown as it would appear when mated to ball housing 10 on the left side of the drawing. The wiring 20 of both switch assemblies 9 are connected parallel to male/female plug 22 and then to male/female plug 24. When the flexible switch membrane 16, integral to a foil or conductive material 17, on its backside is pressed against the rear rigid portion 14 containing protruding contacts 18, a brief series of mouse related squeaks are initiated through the second synthesizer 38 circuit. The circuit wiring 20 of assembly 9 bypasses the switch 34 of synthesizer assembly 8. The power source 28 contained by mounting frame 30 of sound synthesizer assembly 8, activates the first synthesizer 36 via wires 20 when switch 34 is closed. The second synthesizer 38 is activated by momentarily closing contacts 18 of the switch assembly 9 that bypasses switch 34. The mounting frame or body 39 serves as an integral ground for both synthesizers 36 and 38 when connected to ground wire 40. The sound synthesizer assembly 8 has a base 26 showing a raised molded portion 32 for switch 34, so that a slideable switch lever on the out-side surface of base 26, not shown, can be recessed. The first synthesizer 36, when activated by switch 34, produces a continuous, intermittant scratching sound at spaced intervals. For example, 15 seconds of intermittant scratching sounds and 15 seconds of silence, and this sequence is continuously repeated. If, in the meantime, an animal should press on the pad or membrane 16 activating synthesizer 38, a brief mouse related squeaking can occur during the silent or scratching period of synthesizer 36. Synthesizer assembly 9 will emit squeaking sounds upon contact of the pad or membrane 16 even when switch 34 is in the off position on synthesizer assembly 8. Because of the duality of the synthesizer switches, the pressure sensitive pads are always active, thereby providing further diversity to the device. The base 26 includes a partial hinge 44 mateable to hinge opening 42, an opening 45 is aligned with hole 50, and secured by screw 48, thereby mating base 26 to ball housing 10.

Figure 1B:
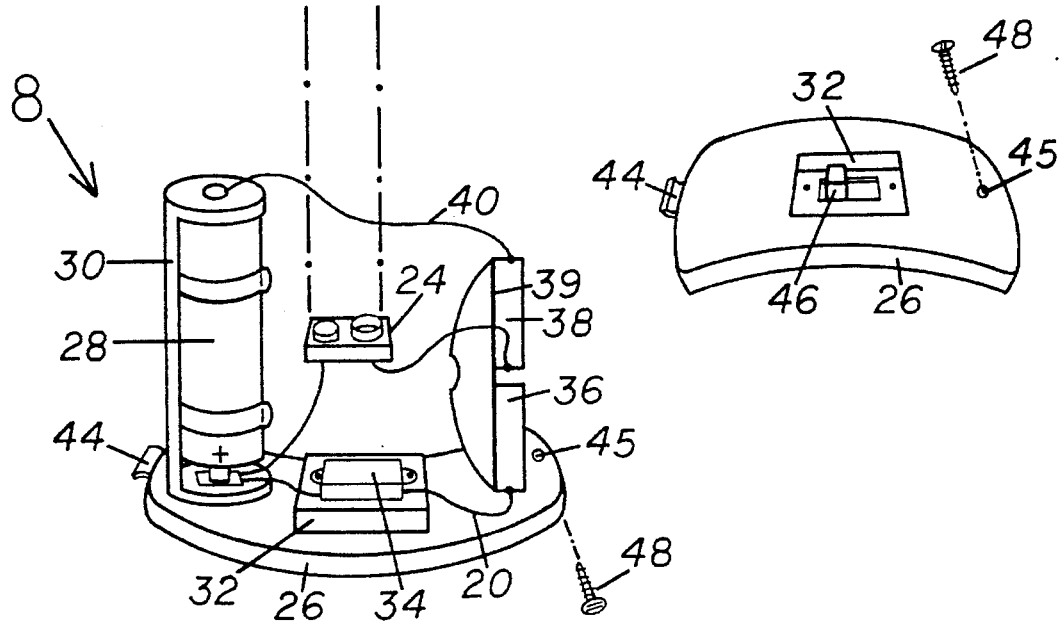
FIG. 1b is a perspective view of the exterior side of the sound synthesizer base.

FIG. 1b is a perspective view of the exterior side of base 26, showing a slideable switch lever 46 within a recessed opening 32, a hinge portion 44, and an opening 45 for insertion of screw 48.

Figure 1C:
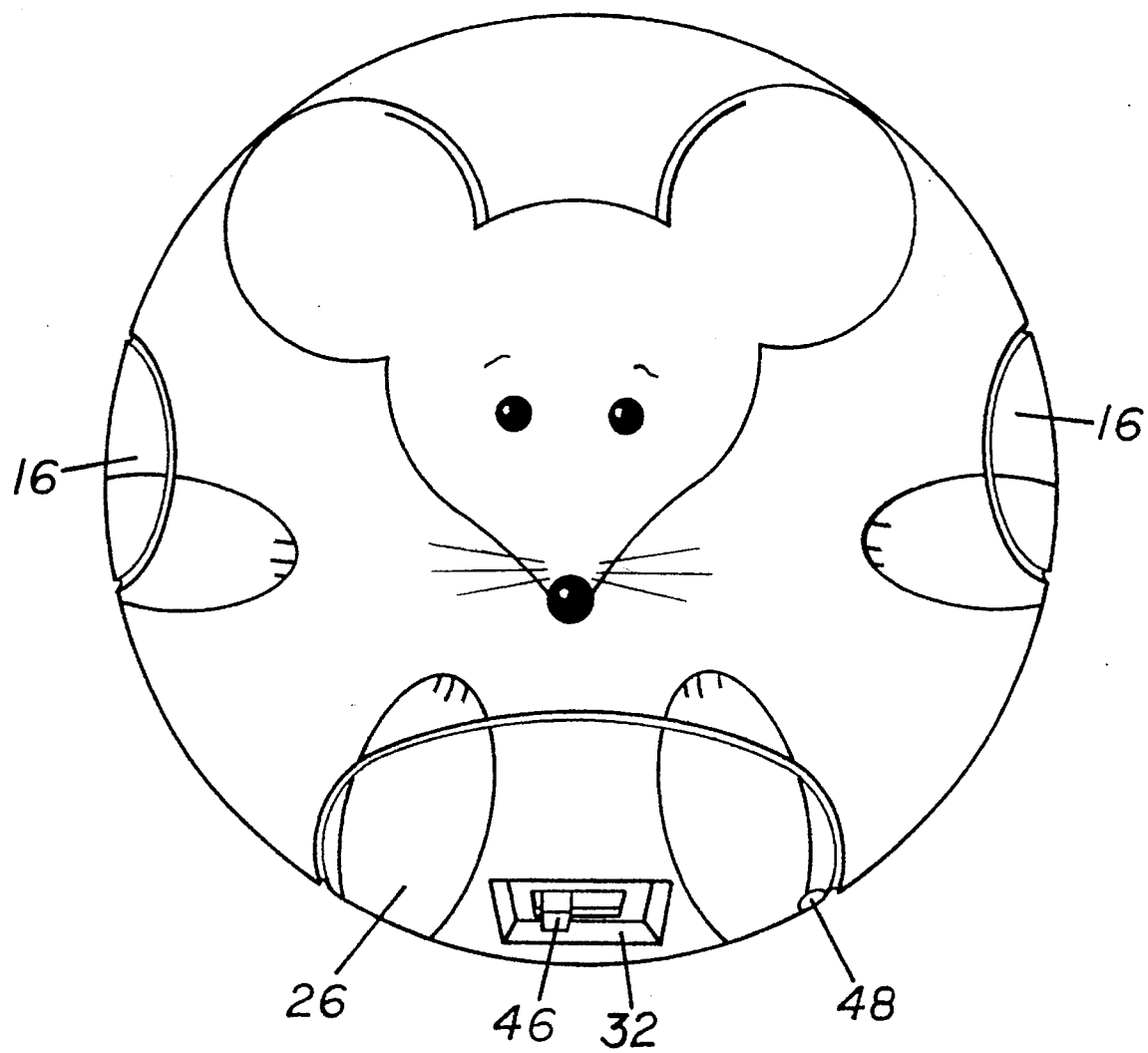
FIG. 1c is a perspective view of the device completely assembled.

FIG. 1c is a perspective view of the ball shaped device assembled, showing the exterior of the synthesizer base 26 containing the slideable switch lever 46 within the base recess 32, and fastened by screw 48. The pressure sensitive switch pads or membranes 16 are shown in their assembled position. The battery or power source, not shown, provides an imbalance within the ball housing, thereby producing an unpredictable, erratic rolling motion. The animal attractant device should not be limited to a rollable shaped housing form, as it is perfectly suitable for housing forms that are slideable, swingable from a tether, and for fixed position housing forms.

Thus, it is clearly evident from the above illustrations and teachings, that the "ANIMAL ATTRACTANT DEVICE" does perform in an outstanding manner, and solves the shortcomings of passive and active devices, past and present, thereby satisfying the consumer's investment with a more realistic approach, reliability, long-lived use, quality, and a more frequently used product. For example, passive or stationary devices, with or without bells or catnip inside their housings, require a human to initiate the first movement before an animal participates with the device. If the device remains static, it is ignored by an animal. Self-moving devices, containing motors within their housings, are too expensive, extremely prone to malfunction, and drain batteries very quickly. The present invention is inexpensive, rugged, long-lived, reliable, has a very effective lure function, and the battery has an extremely long life, thereby assuring economy through the years. Other variations of the above teachings are possible. For example, the synthesizers could be programmed with other luring sounds, such as barking or meowing, suitable for dogs, or a voice talking. It would further be obvious to use an elongated, rollable cylinder or barrel shaped cylinder with a claw scratching material affixed to the outside surface, while using an electronic sound synthesizer within the device as a lure. Further, it would be obvious to hang a lure assembly from a tether. A stationary device for claw scratching, grooming, or amusement can be provided with a sound synthesizer to promote more frequent use. Animal attractant sounds can also be produced by electromechanical means.

CONCLUSION

While the above descriptions contain many specific details, these should not be construed as limitations on the scope of the invention, but rather as examples of embodiments or modifications, herein detailed in accordance with the descriptive requirements of law. It should be understood that the details are to be interpreted as illustrative and not in a limiting sense.

We claim:

1. An animal attractant device comprising:

a spherical ball-shaped enclosure forming a housing;

an electronic sound synthesizer assembly affixed within said housing, said sound synthesizer assembly comprising a first sound synthesizer and a second sound synthesizer, said first synthesizer producing a first sound and second synthesizer producing a second sound distinctly different from said first sound;

a power source disposed within said housing;

a manual on/off switch electrically connecting said first sound synthesizer to said power source for activating said first sound synthesizer; and at least one pressure sensitive switch connecting said second sound synthesizer to said power source for activating said second sound synthesizer independently of said first sound synthesizer; said at least one pressure sensitive switch being disposed on the outside of said housing.

2. The animal attractant device of claim 1, wherein said first sound simulates a scratching sound.

3. The animal attractant device of claim 2, wherein said second sound simulates a mouse-like squeaking sound.

4. The animal attractant device of claim 1, wherein said second sound simulates a mouse-like squeaking sound.

5. The animal attractant device of claim 1, wherein said first sound is intermittently produced by said first sound synthesizer when said manual switch is closed.

6. The animal attractant device of claim 1, wherein said power source is a battery.

7. The animal attractant device of claim 1, wherein there are two pressure sensitive switches disposed on opposite sides of said housing.

\* \* \* \* \*